United States Patent [19]

Shibuya et al.

[11] Patent Number: 5,307,329
[45] Date of Patent: Apr. 26, 1994

[54] MAGNETO-OPTICAL RECORDING HEAD COMPRISING A STEP-DOWN TRANSFORMER

[75] Inventors: Giichi Shibuya; Takashi Onodera, both of Nagano, Japan

[73] Assignee: TDK Corporation, Tokyo, Japan

[21] Appl. No.: 972,219

[22] Filed: Nov. 5, 1992

[30] Foreign Application Priority Data

Nov. 7, 1991 [JP] Japan .................................. 3-320027

[51] Int. Cl.⁵ .............................................. G11B 11/00
[52] U.S. Cl. ...................................... 369/13; 360/114; 360/59; 365/122
[58] Field of Search ................... 369/13, 14, 127, 146; 360/114, 59, 137, 66, 122–129, 103, 60, 118; 361/143, 152; 365/122

[56] References Cited

U.S. PATENT DOCUMENTS 5,229,902 7/1993 Zucker et al. ...................... 360/114

FOREIGN PATENT DOCUMENTS 3-157839 7/1991 Japan .

Primary Examiner—Robert J. Pascal
Assistant Examiner—Ali Neyzari
Attorney, Agent, or Firm—Oblon, Spivak, McClelland, Maier & Neustadt

[57] ABSTRACT

An improved information-modulate magnetic field generating circuit for magneto-optical recording which uses a step-down transformer whose secondary winding has less turns than the primary winding, thus permitting substantial reduction of electric power for driving the magnetic head coil.

7 Claims, 3 Drawing Sheets

MAGNETO-OPTICAL RECORDING HEAD COMPRISING A STEP-DOWN TRANSFORMER

BACKGROUND OF THE INVENTION

The present invention relates to an improvement in or relating to an apparatus for recording a magneto-optical recording medium in a magnetic field-modulation mode.

The usefulness of optical disks as a large capacity information memory has been noted. One example of such optical disks is magnetic modulation type magneto-optical recording disks, which are expected to be prospectively used as data files. In the magnetic field-modulation type magneto-optical recording a beam of light from the laser of an optical head is thrown to the recording layer of the magneto-optical recording disk in a DC manner to raise its temperature, and at the same time, an information-modulated magnetic field is applied to the recording layer of the disk by a magnetic head, which is put on the side opposite to the optical head. This permits the overwriting of different pieces of information on one and same recording medium, and therefore, the possibility of use as an overwriting compact disk has been thought of.

As for magnetic field-modulation type magnetic heads or magnetic heads used in the magnetic field-modulation mode, there are two kinds of heads, that is, a floating magnetic head which is responsive to rotation of the disk for floating up above the rotating disk like a magnetic head for a hard disk device, and a non-flying magnetic head. The non-flying magnetic heads include two types, stationary type wherein the head is spaced from the disk surface at a fixed distance and sliding type wherein the head is mounted on a slider such that the head is retracted a fixed distance from the surface of the slider in sliding contact with the disk whereby the head is maintained at the fixed distance from the disk surface during operation. The strength of the magnetic field to be applied to the disk surface will increase with decrease of the distance between the disk and the magnetic head. An interference between the disk and the stationary magnetic head is liable to be caused by the swaying of the rotating disk surface if the disk is bent or deformed. With a view to avoid such an interference a deviation detecting sensor is used to keep the stationary magnetic head at a fixed distance from the rotating disk.

Non-flying type magnetic heads are not responsive to the rotation of the disk, and may be advantageously used for disks rotating at a relatively low speed such as compact disks. These magnetic heads have less troubles caused by projecting objects attached to the disk surface, if any. The magnetic heads equipped with no deviation sensing means are simple in structure and are less expensive.

Non-flying stationary type magnetic heads for magnetooptical recording must be used with their head cores placed an increased distance apart from recording mediums, compared with floating type magnetic heads for hard disk devices, and accordingly a strong magnetic field must be used. In this connection it is necessary that a heavy current, say, 1 A p-p flows in the coil wound around the head core, and it is necessary that a heavy modulation circuit is designed so as to carry such a heavy current. In operation, this current must be reversed repeatedly at an increased frequency, say, 1 MHz.

FIG. 3 shows a conventional circuit for generating an information-modulated magnetic field. It comprises a coil $L_H$ wound around the core of a magnetic head and having an inner resistance $R_H$, and switching elements $S_{11}$, $S_{12}$, $S_{21}$ and $S_{22}$, which are responsive to signals from associated control means for opening or closing, thereby reversing the current flowing in the head coil $L_H$.

These switching elements have an inner resistance, say, 1 to 2 ohms, and therefore, a substantial power loss will be caused when a heavy current of about 1 A p-p flows in these switching elements. The inner resistances of the switching elements will increase with increase of the temperature of the head coil, which is caused by the flowing of such heavy current therein, and the power loss will increase accordingly. Additional power loss will be caused by the resistance of the conductors extending to the head core.

It is, in fact, necessary that a power supply is designed to provide extra power enough to compensate for such power loss, and accordingly the operating efficiency will be lowered.

SUMMARY OF THE INVENTION

One object of the present invention is to provide an apparatus for recording a magneto-optical recording medium in a magnetic field-modulation mode which can reduce power loss to possible minimum.

To attain this and other objects, an apparatus for recording a magneto-optical recording medium in a magnetic field-modulation mode; comprising an optical head projecting a laser beam of a fixed strength to the magneto-optical recording medium; a magnetic head generating a modulated magnetic field; and a magnetic head driving circuit comprising at the final stage a transformer whose secondary winding has less number of turns than primary winding is provided.

According to one aspect of the present invention the number of turns of the primary winding is two or more times larger than that of the secondary winding.

According to another aspect of the present invention the magnetic head is 0.04 or more milimeters apart from the magneto-optical recording medium.

As described above, a step-down transformer whose secondary winding (on the side of the magnetic head) has a less number of turns than the primary winding (on the side of power supply) is used at the final stage of an associated magnetic drive circuit, thereby permitting the supplying of electric power in the form of high voltage and low current to a possible closest point to the magnetic head coil, and the supplying of electric power in the form of low voltage and high current to the magnetic head coil. Thus, electric power loss caused in the resistances of the switching elements and conductors on the primary winding side of the step-down transformer can be reduced to a possible minimum, and the current flowing in the magnetic head coil can be reversed as quickly as in a conventional magnetic drive circuit equipped with no transformer.

Other objects and advantages of the present invention may be understood from the following description of its preferred embodiments, which are shown in accompanying drawings:

DETAILED DESCRIPTION OF THE INVENTION

In a magneto-optical recording apparatus comprising an information-modulated magnetic field generator according to the present invention, a magnetic head is placed close to the front side (recording layer) of a magneto-optical recording disk whereas an optical head is placed close to the rear side of the magneto-optical recording disk, projecting a laser beam of a fixed strength to the recording layer of the disk. The magnetic head generates a magnetic field modulated with pieces of information to be recorded, and the area of the disk spotted with the laser beam is exposed to the information-modulated magnetic field. The magnetic head and the optical head are fixed in their relative position, and these heads can be moved together diametrically across the disk to have an access to a selected track.

Figure 1:
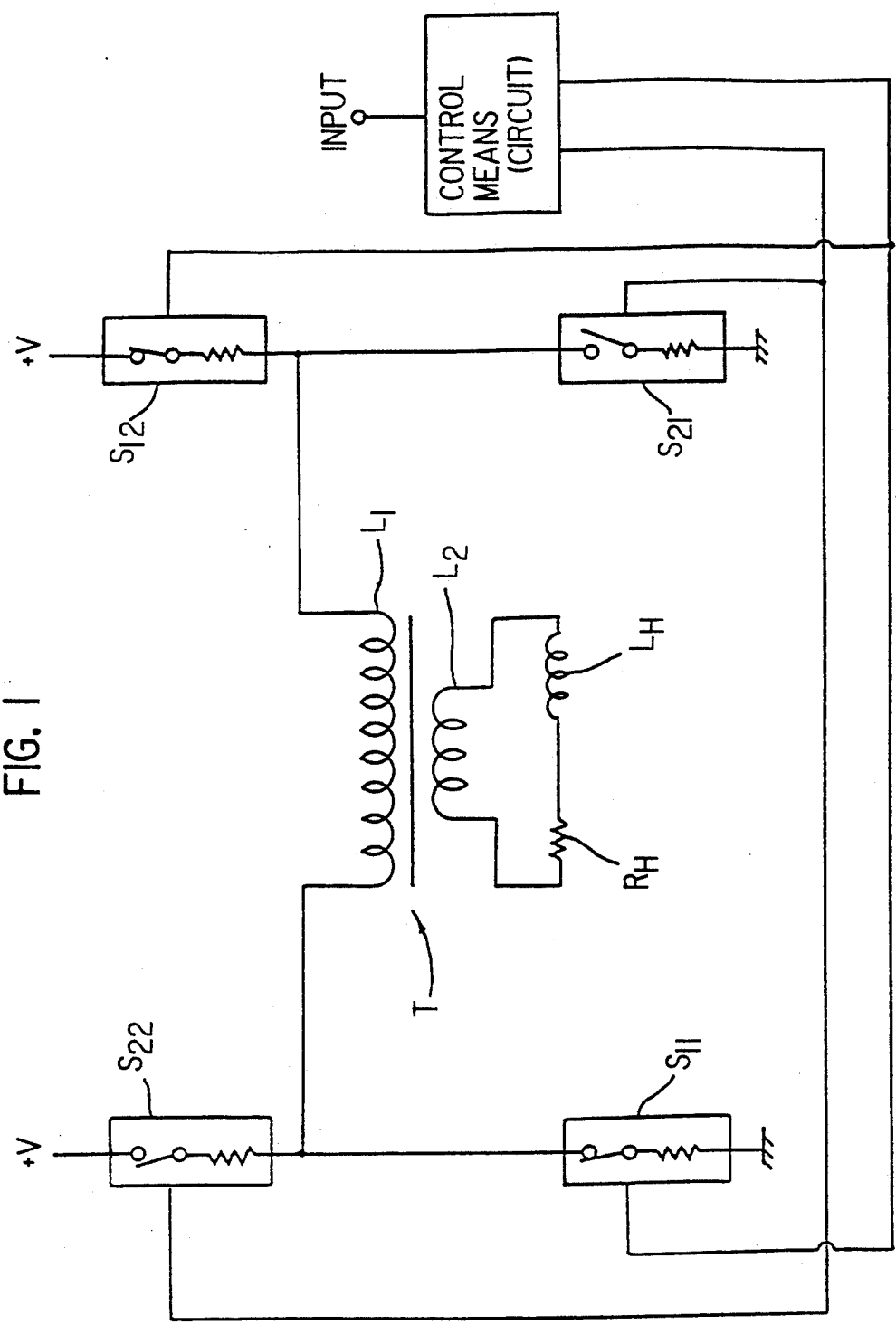
FIG. 1 shows diagrammatically an information-modulated magnetic field generator according to one embodiment of the present invention.

FIG. 1 shows diagrammatically an information-modulated magnetic field generator according to one embodiment of the present invention. In the drawing a step-down transformer T has a primary winding $L_1$ and a secondary winding $L_2$. The secondary winding $L_2$ has a magnetic head coil $L_H$ connected thereacross. The magnetic head coil $L_H$ has an internal resistance $R_H$. Switching elements $S_{11}$, $S_{12}$, $S_{21}$ and $S_{22}$ are transistors, and are connected to a control means.

In FIG. 1, the switching elements $S_{11}$ and $S_{12}$ turn "on" whereas the switching elements $S_{21}$ and $S_{22}$ turn "off", and therefore, the electric current flows in the switching element $S_{12}$, the primary winding $L_1$ and the switching element $S_{11}$ in the order named, thus causing an induced electric current to flow in the secondary winding $L_2$ and the magnetic head coil $L_H$.

Assume that a signal is applied to the control means for reversing the magnetic field. Then, the switching elements $S_{11}$ and $S_{12}$ are caused to turn "off" and, at the same time, the switching elements $S_{21}$ and $S_{22}$ are caused to turn "on". As a result the electric current is reversed in direction, flowing in the switching element $S_{22}$, the primary winding $L_1$ and the switching element $S_{21}$ in the order named, thus reversing the induced electric current in the secondary winding $L_2$ and the magnetic head coil $L_H$.

The ratio of the number of turns $T_1$ of the primary winding $L_1$ to the number of turns $T_2$ of the secondary winding $L_2$ of the step-down transformer used in the information-modulated field generating circuit is larger than one, i.e. $T_1/T_2 > 1$. Thus, the electric current flowing in the primary winding of the step-down transformer is equal to $T_2/T_1$ times the electric current flowing in the secondary winding. The ratio of $T_1/T_2$ can be determined in consideration of the circuit resistance, the magnitude of electric current required in the secondary winding and other circuit factors. Preferably $T_1/T_2$ is equal to or larger than 2, and most preferably it is equal to or larger than 3.

Figure 2:
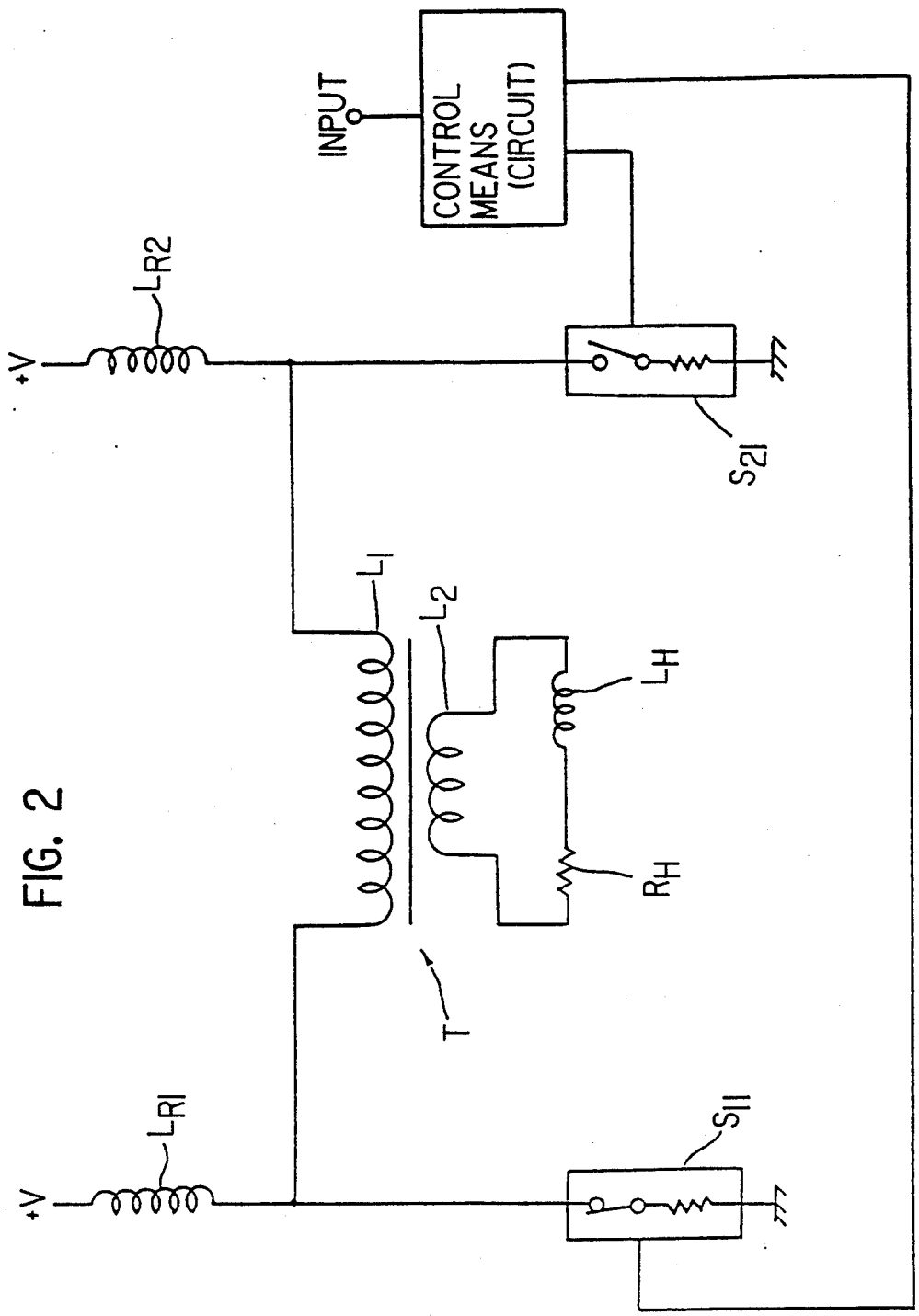
FIG. 2 shows diagrammatically an information-modulated magnetic field generator according to another embodiment of the present invention.

FIG. 2 shows diagrammatically an information-modulated magnetic field generator according to another embodiment. It uses electric current reversing coils $L_{R1}$ and $L_{R2}$ in place of the switching elements $S_{22}$ and $S_{12}$ respectively in FIG. 1. In the drawing the switching element $S_{11}$ turns "on" whereas the switching element $S_{21}$ turns "off", and therefore, the electric current flows in the electric current reversing coil $L_{R2}$, the primary winding $L_1$ and the switching element $S_{11}$ in the order named, and at the same time, the electric current flows in the electric current reversing coil $L_{R1}$ and the switching element $S_{11}$.

A command signal for reversing the magnetic field is applied to the control means, thereby permitting the control means to put the switching element $S_{11}$ in the "off" condition and, at the same time, the switching element $S_{21}$ in the "on" condition, thus switching the electric current from flowing to the ground from the electric current reversing coil $L_{R1}$ to flowing to the primary winding $L_1$. The electric current reversing coil $L_{R1}$ is liable to keep the electric current flowing therein, and the counter electromotive force appearing therein causes the reversed electric current to rise quickly, thus permitting the quickest reversal of the current.

To effect quick reversal of the electric current it has been proposed that the inductance $L_H$ of the magnetic head coil be reduced to a possible minimum, and that a voltage source whose voltage ranges from several tens to hundreds be used with an extra resistance attached thereto. The use of such electric current reversing coils facilitates generation of magnetic field of increased strength thanks to their counter electromotive force, requiring neither extra resistance nor a relatively high voltage source.

The use of electric current reversing coils is disclosed in Japanese Patent Application Kokai No. 3-157839, and its application to information-modulated magnetic field generators according to the present invention provides an advantage of substantially reducing the electric power loss.

Also, a constant current source as disclosed in Japanese Patent Application Kokai No. 3-157839 and may be used in the circuits of FIGS. 1 and 2 when occasions demand.

An information-modulated magnetic field generating circuit according to the present invention may be used in a variety of magneto-optical recording systems, and is suitable to a magneto-optical recording system having a non-flying magnetic head placed a relatively long distance, say, 0.04 or more milimeters, especially 0.04 to 0.3 mm apart from a magneto-optical recording medium.

The magnetic field intensity in the recording spot is preferably in the range of about 100 to 400 Oe although it is not particularly limited in the practice of the invention.

The magnetic head may be constructed by providing a winding on a core, mounting the core in a casing, and securing the casing in a recording/reproducing deck such that the core is spaced a fixed distance from the surface of a disk to be loaded or by mounting the wound core in a slider such that the core is retracted a fixed distance from the surface of the slider in sliding contact with the disk and mounting the slider in a recording/reproducing deck for sliding contact with the disk.

The structure of the magneto-optical recording disk used herein is not particularly limited as long as the disk is of the single side recording type because the distance between the magnetic head primary magnetic pole and the disk surface should be extremely small.

The magneto-optical disk may include a protective layer, a recording layer, another protective layer, a reflective layer and a protective coat laid up on one major surface of a substrate in the described order. The disk may have a hard coat on the rear surface of the substrate if desired. The hard coat may be formed on the outer and inner peripheral edges of the disk in addition to the disk major surface.

The substrate may be formed of any desired material which is transparent, for example, glass and resins. Examples of the transparent resin include polycarbonate resins, acrylic resins, amorphous polyolefin resins, and styrene resins. The surface of the substrate on which the recording layer is formed is provided with grooves and pits for tracking purposes, if desired.

The transparent hard coat formed on the rear surface of the substrate may be formed of a radiation curable resin as is the protective coat. The hard coat is preferably about 1 to 30 μm, especially about 3 to 10 μm. The transmittance of recording or reproducing light by the substrate through the hard coat should preferably be at least 80%, especially at least 85%.

The protective layers are effective for improving the C/N and corrosion resistance of the recording layer. Preferably the lower protective layer is about 30 to 300 nm thick and the upper protective layer is about 10 to 50 nm thick. These protective layers may be inorganic thin films which are formed from oxides, carbides, nitrides, sulfides or mixtures thereof by various vapor phase deposition techniques such as sputtering, evaporation and ion plating, preferably by sputtering.

If desired, an intermediate layer of dielectric material may be provided between the protective layer and the recording layer for the purposes of improving C/N and corrosion resistance.

The recording layer is one in which information is magnetically recorded using a modulated magnetic field and the recorded information is reproduced through magneto-optical conversion. The recording layer may be formed of any desired material which is capable of such magneto-optical recording. Preferably, it is prepared by depositing an alloy containing a rare earth metal element, especially a rare earth metal-transition metal alloy by sputtering, evaporation or ion plating, preferably by sputtering, to form an amorphous film. The preferred rare earth metal is at least one element of Tb, Dy, Nd, Gd, Sm, and Ce. The preferred transition metals are Fe and Co. Then the alloy preferably contains 65 to 85 atom % of Fe and Co in total, with the balance being essentially a rare earth metal or metals. Some preferred examples of the recording layer composition are TbFeCo, DyTbFeCo, NdDyFeCo, and NdGdFeCo. The recording layer may contain up to 10 atom % of Cr, Al, Ti, Pt, Si, Mo, Mn, V, Ni, Cu, Zn, Ge, Au or the like. It may further contain up to 10 atom% of another rare earth metal element such as Sc, Y, La, Ce, Pr, Pm, Sm, Eu, Ho, Er, Tm, Yb, and Lu. The recording layer 5 is generally about 10 to 1,000 nm thick.

For the reflective layer, a metal such as Cu, Au, Ag, Pt, Al, Ti, Cr, Ni, and Co or an alloy or compound thereof is preferred. The reflective layer may be formed in the same manner as the recording layer 5. It is preferably about 30 to 200 nm thick.

No limit is imposed on the structure of the magnetic head and the optical head. A choice may be made of magnetic and optical heads commonly used in magneto-optical recording.

Example

Figure 3:
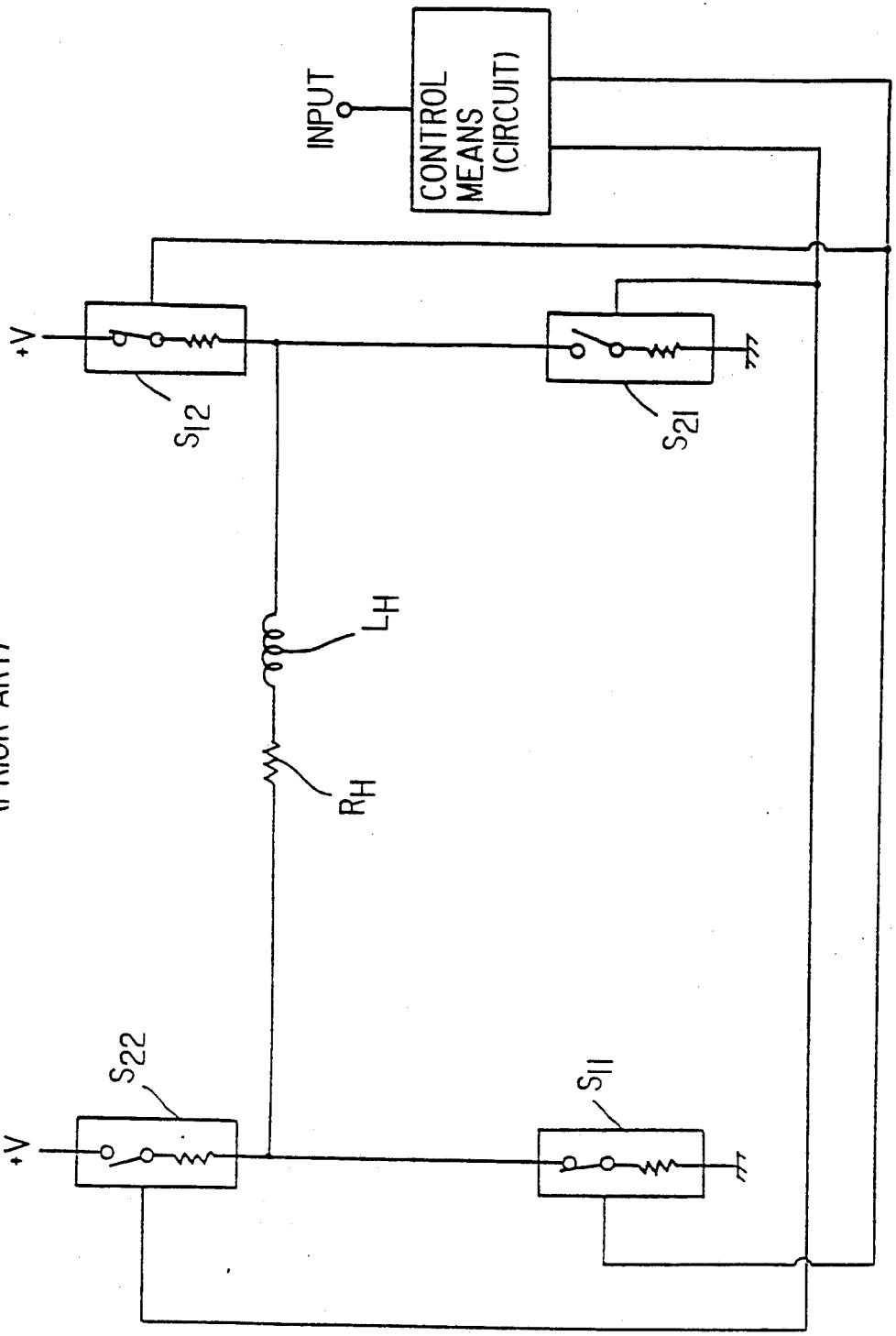
FIG. 3 shows diagrammatically a conventional information-modulated magnetic field generator.

An information-modulated magnetic field generating circuit of FIG. 1 was compared with a conventional information-modulated magnetic field generating circuit of FIG. 3. The magnetic heads used in these circuits have an inductance of 6.4 $\mu$H and an inner resistance of 2.0 $\Omega$(1 MHZ), and an electric current of 0.8 A p-p was made to flow in the magnetic head coils.

The conventional circuit of FIG. 3 required 6.5 volts and 0.4 amperes, and therefore, the electric power required for driving the magnetic head was 2.6 W. The circuit of FIG. 1 using a step-down transformer whose primary to secondary winding ratio was 3 required 12.0 volts and 0.11 amperes, and therefore, the electric power required for driving the magnetic head with the same current as in the conventional circuit of FIG. 3 was 1.3 VA. Thus, the electric power was reduced by 50%.

EFFECT

As may be apparent from the above, the apparent electric power required for driving the magnetic head can be drastically reduced by using an information-modulated magnetic field generating circuit according to the present invention in a magneto-optical recording system.

What is claimed is:

1. An apparatus for recording on a recording medium in a magnetic field-modulation mode, comprising:
   an optical head projecting a laser beam of a fixed strength to the recording medium;
   a magnetic head generating a modulated magnetic field; and
   a magnetic head driving circuit comprising at the final stage a transformer having a primary winding and a secondary winding and whose secondary winding has less turns than the primary winding.

2. The apparatus of claim 1, wherein the number of turns of the primary winding is two or more times larger than that of the secondary winding.

3. The apparatus of claim 1 or 2, wherein the magnetic head is at least 0.04 millimeters apart from the magneto-optical recording medium.

4. An apparatus according to claim 2, wherein the secondary winding is electrically connected with a magnetic head coil forming a closed loop therewith.

5. An apparatus according to claim 4, further comprising means for providing electric power to the primary winding, said means for electrically coupled to the primary winding.

6. An apparatus according to claim 5, wherein said means comprises a control means for controlling when current flows through the primary coil.

7. An apparatus according to claim 6, wherein said control means comprises two switches, each of the two switches being electrically coupled to said primary coil and to ground.

* * * * *